United States Patent [19]

DiMatteo

[11] 4,285,754

[45] Aug. 25, 1981

[54] METHOD AND APPARATUS FOR PRODUCING PLANAR ELEMENTS IN THE CONSTRUCTION OF SURFACES AND BODIES

[75] Inventor: Paul DiMatteo, Huntington, N.Y.

[73] Assignee: Solid Photography Inc., Melville, N.Y.

[21] Appl. No.: 91,143

[22] Filed: Nov. 5, 1979

[51] Int. Cl.³ .............................................. B32B 31/18
[52] U.S. Cl. ...................................... 156/264; 29/412; 29/413; 29/414; 29/415; 29/418; 29/433; 83/29; 83/33; 83/39; 83/40; 83/55; 156/267; 156/512; 156/513; 156/516; 156/517; 264/152; 264/153; 264/154; 264/156
[58] Field of Search ............... 156/250, 252, 260, 261, 156/264, 265, 267, 268, 269, 270, 510, 512, 528, 513, 516, 517; 264/138, 145, 152, 153, 154, 156; 83/29, 33, 39, 40, 49, 50, 55; 29/412, 413, 414, 415, 418, 433

[56] References Cited

U.S. PATENT DOCUMENTS

| | | | |
|---|---|---|---|
| 2,283,629 | 5/1942 | Heftler | 29/433 |
| 3,475,526 | 10/1969 | Seto | 264/153 |
| 3,518,756 | 7/1970 | Bennett et al. | 264/145 |

*Primary Examiner*—Caleb Weston

*Attorney, Agent, or Firm*—Max Fogiel

[57] ABSTRACT

An arrangement for fabricating planar elements which may be stacked for producing predetermined surfaces and bodies. The planar elements have cross-sections corresponding to respective cross-sections of the surface to be constructed. The planar elements are formed by cutting them from plate-shaped material or sheet metal, and the cut-out elements are held to the parent sheet or plate material by tabs. The planar elements are cut successively from the sheet or plate-shaped material at spaced intervals. The cutting action is such as to leave the tabs for holding the planar elements in place. Registration holes are punched about the planar element, so that these may be readily stacked relative to each other, as required to form the surface to be constructed. Sprocket holes are also punched in the sheet material to advance the material along a processing path at which the various processing stations are located. After a blank together with the cut planar element is cut or punched out from the plate or sheet material, the blank is stacked with other blanks, and the tabs are severed to remove the stacked planar elements from the remaining portions of the blanks. Adhesive is applied to selected areas of the planar elements and/or blanks to result in easy removal of the planar elements from the remaining blank material.

12 Claims, 6 Drawing Figures

METHOD AND APPARATUS FOR PRODUCING PLANAR ELEMENTS IN THE CONSTRUCTION OF SURFACES AND BODIES

BACKGROUND OF THE INVENTION

The construction of surfaces based on the principle of stacking planar elements and connecting them to each other by adhesive means, for example, is already known in the art. The fabrication of the planar elements, however, so that they can be readily assembled and separated from their parent or base plates or sheets, has required considerable improvement from the prior art so that these planar elements can be produced in large quantities in an economical manner.

In producing the planar elements for construction of surfaces, it is essential that the elements become stacked in precise registration relative to each other. The planar elements, moreover, must be cut from a parent material which is plate-shaped material or sheet metal or other sheet material, for example. This parent material must be advanced in precise increments to and from processing stations along a production line. Cutting of the planar elements must also be achieved in a precise manner for the purpose of approximating as precisely as possible the surface to be constructed. The cutting action to form the planar elements, moreover, must leave tabs, for example, to retain the planar elements in place with respect to the parent material during further processing after the cutting operation. The planar element together with the registration holes are cut from the initial or parent material by a blanking operation, and the resulting blanks must be stackable relative to each other in any easy manner, after adhesive has been selectively applied to surfaces of the planar element and/or the blank surfaces. These numerous production steps have not been satisfactorily carried out in the past whereby they were coordinated and arranged to allow for large-quantity production at economical rates.

Accordingly, it is an object of the present invention to provide an arrangement for producing planar elements for the construction of surfaces and bodies, in an efficient manner with minimum number of steps comprised of simple operations.

Another object of the present invention is to provide an arrangement of the foregoing character which produces minimum material wastes.

A further object of the present invention is to provide an arrangement, as described, which may be readily maintained in service and which has a substantially long operating life.

SUMMARY OF THE INVENTION

The objects of the present invention are achieved by producing or preparing the planar elements from plate-shaped or sheet material which is fed along a processing path. The material has punched into it sprocket holes to enable the material to be advanced at precise intervals among the processing stations located along the processing path.

In addition to the sprocket holes, registration holes are also punched through the material within a predetermined area confining the planar element to be formed. The registration holes allow the planar elements to be stacked relative to each other in a precise manner.

The planar element is formed by cutting along a predetermined contour through the material. The contour corresponds to the outline of the planar element to be formed, and the cutting action is such as to leave tabs in the cutting path. The tabs serve to retain in place the planar element with respect to the parent material.

After the planar element has been formed, an area of the material which includes the planar element as well as the registration holes, is blanked or punched out from the parent base material having the sprocketed holes.

The blanks become, thereafter, stacked relative to each other, after adhesive has been applied to selective areas of the planar elements and selected areas of the surfaces of the surrounding blank material. This surrounding blank material is removed for purposes of obtaining a stack of planar elements conforming to the surface or body to be constructed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
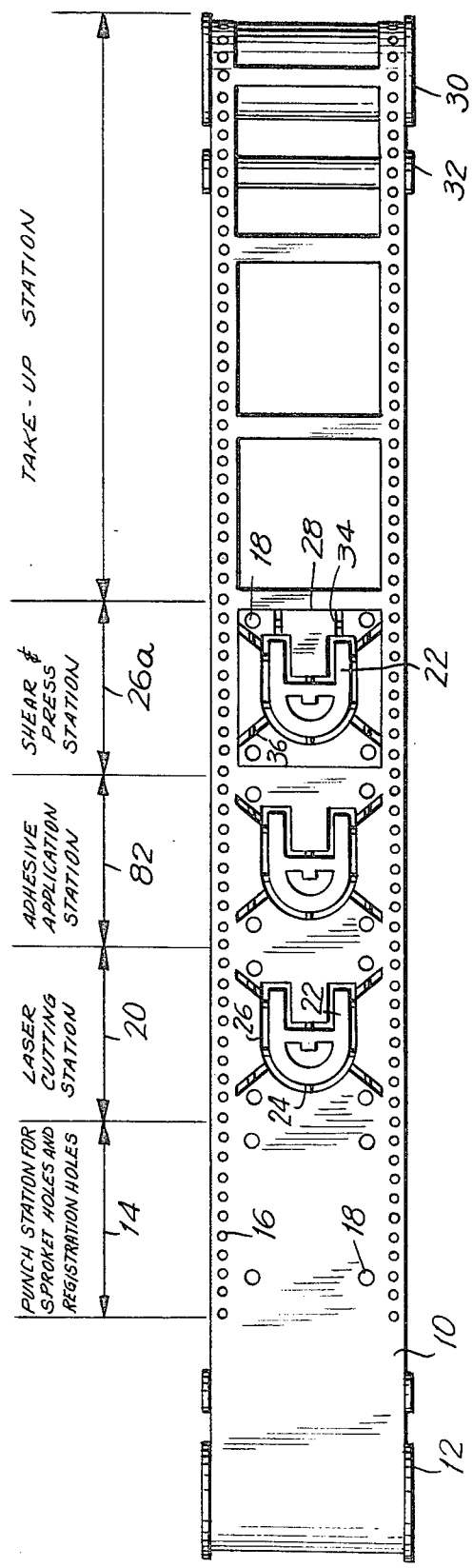
FIG. 1 is a plan view of a sheet metal strip that has been passed through various processing steps in the production of blanks for the formation of planar elements.

Referring to the drawings, and in particular to FIG. 1, a strip of sheet metal 10, for example, is unwound from a storage reel 12 and advanced to a processing station 14 which punches into the material 10, sprocket holes 16 and registration holes 18. The strip material is then further advanced in the production line, to a processing station 20 in which the planar element 22 is cut from the strip material. The cutting may be performed by a laser beam, for example. In cutting through the strip 10 to form the planar element 22, tabs 24 are left within the cut path 26 surrounding the planar element 22. The tabs 24 serve to hold the planar element 22 in place for further processing. Without the tabs 24, the planar element would, for example, drop out of the strip 10 after the cutting procedure has been completed. The tabs 24, moreover, are distributed about the contour of the planar element so that the removal of the planar element from the remaining strip material is readily achieved.

Figure 6:
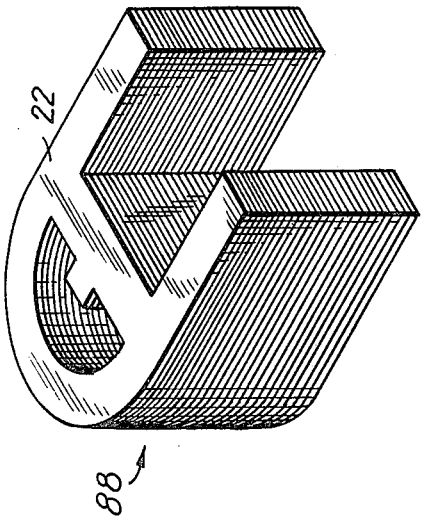
FIG. 6 is a perspective view and shows the surface and body resulting from the stacked planar elements.

After the cutting action by which the planar element 22 is formed has been completed, the strip 10 is advanced to a processing station 82 at which adhesive is applied to selected areas of the planar element 22 and surrounding strip 10. The adhesive is used to hold the planar elements together after they have been stacked, as shown in FIG. 6. Adhesive may also be applied selectively to the strip material surrounding the planar element for the purpose of facilitating easy removal of the surrounding strip material after the planar elements have been stacked. For this purpose, the surrounding strip material may have adhesive applied to it in groups, with each group comprised of a predetermined number of planar elements and surrounding strip material. Whereas adhesive is applied to the surrounding material within the groups, adhesive is omitted to separate groups from each other and thereby provide for easy removal of the strip material from the planar elements.

After adhesive has been selectively applied at the processing station 82, the strip material 10 is advanced to processing station 26a where a blank 28 is cut from the strip. As shown in FIG. 1, the blank has a rectangular shape and includes the registration holes as well as the cut planar element 22.

After the blank 28 has been punched or pressed out of the strip material 10, the remaining strip material with the sprocket holes, is collected on a take-up reel 30. A drive sprocket 32 engages the sprocket holes 16 and provides for precise advancement of the strip 10 through increments to and from processing stations.

For purposes of facilitating removal of the blank material surrounding the planar element 22, parting cuts 34 may also be applied to the strip material 10 prior to performing the blanking operation at processing station 26. The cutting lines 34 form parting planes when the blanks have been stacked, and thereby provide for easy removal of sections of the unwanted material surrounding the planar element 22. These parting cuts 34 may be applied at the processing station 20 where the planar element is cut from the strip material, for example, or they may be applied after the blanking operation at processing station 26 has taken place. Depending on the size and weight of the blank 28, tabs 36 may also be left within the cuts 34 to provide for sufficient support of the surfaces within the blank.

Figure 2:
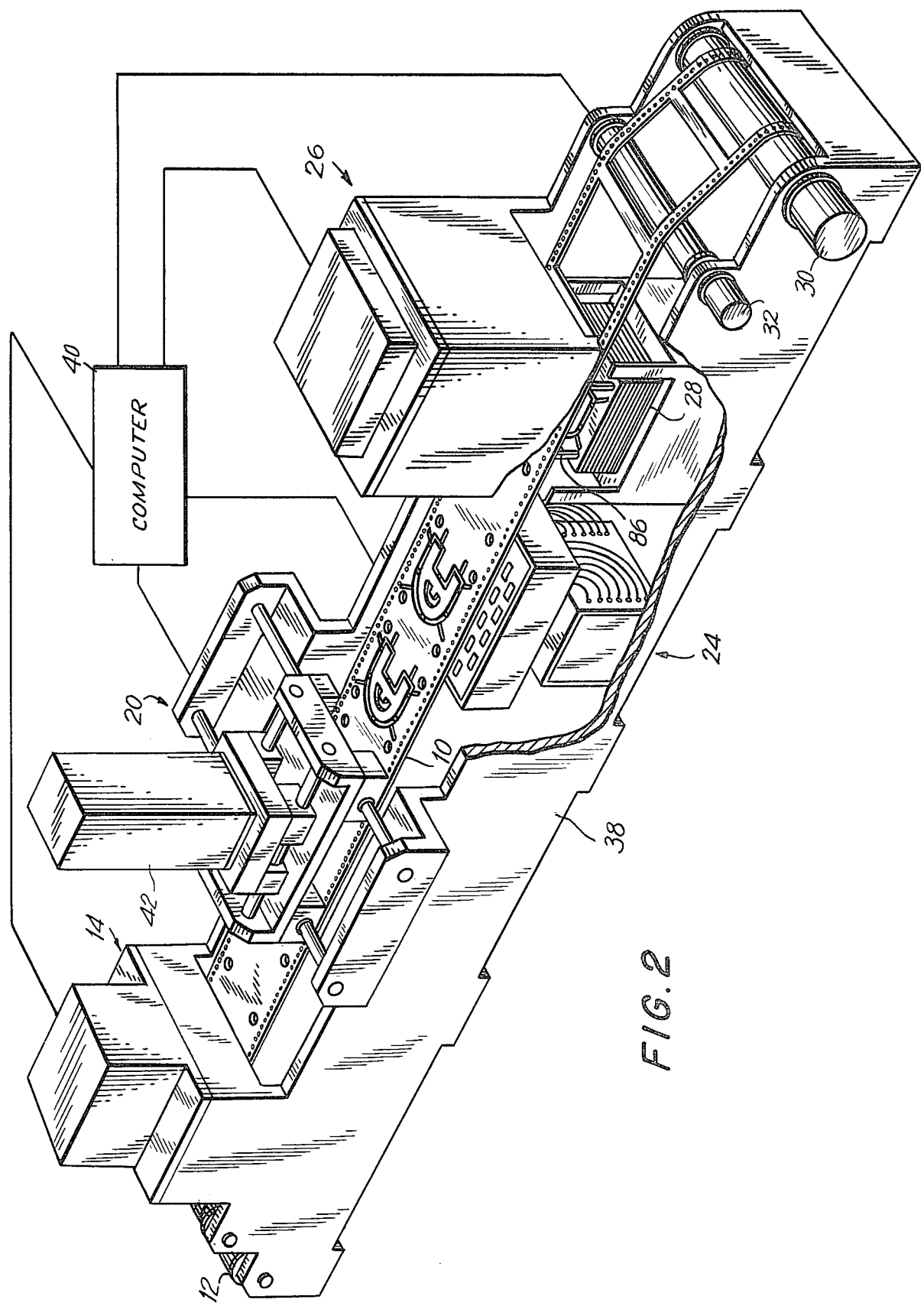
FIG. 2 is a perspective view of a production line with processing stations located along the line through which the strip of FIG. 1 is transported.

FIG. 2 shows how the several processing stations are mounted on a main frame 38 supporting the entire production line. A computer 40 serves to provide operating signals in proper sequence to actuate the processing stations at the required instants. Thus, after sprocket and registration holes have been punched at the station 14, for example, the computer 40 applies a signal to the drive sprocket 32 for the purpose of advancing the strip 10 to the cutting station 20. At this station, a laser cutting head 42 is displaced along the predetermined contour by means of a X-Y positioning table through signals received from the computer 40. After the cutting action has been completed, the computer then actuates the adhesive applying station 82 whereby adhesive is sprayed, for example, onto the selected areas of the planar element and surrounding strip material. The computer then actuates, in sequence, the blanking station 26 to produce the blanks 28. The computer 40 controls the sequence of operations along the production line, and provides the necessary signals for carrying out the operations.

Figure 3:
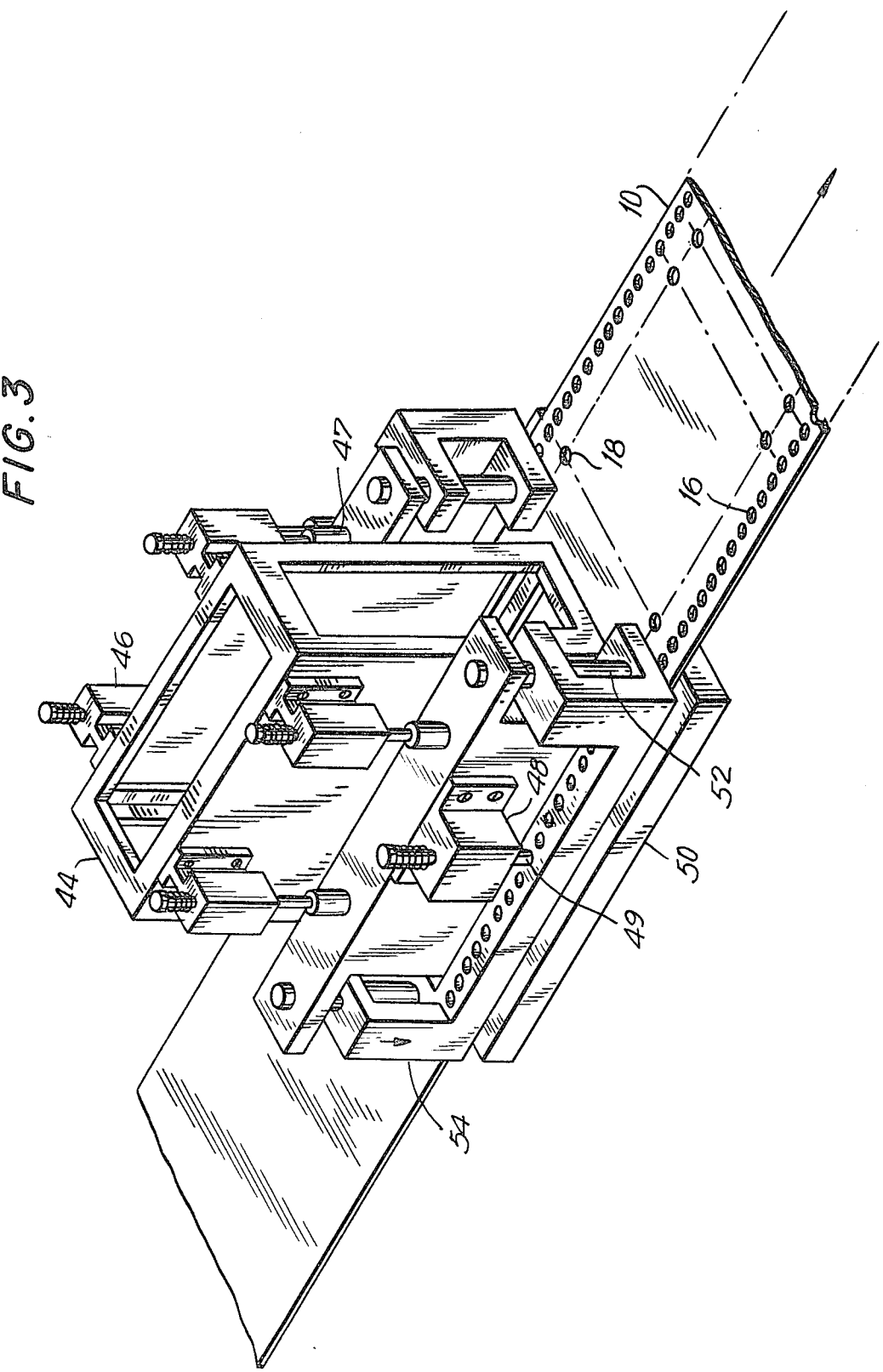
FIG. 3 is a perspective view and shows the processing station for punching sprocket and registration holes.

The construction of the mechanism which punches the sprocket and registration holes into the strip material 10, is shown in FIG. 3. A punch frame 44 supports solenoids 46 which actuate pins 47 to form the registration holes 18. Attached to the punch frame 44, are also solenoids 48 which actuate pins 49 to form the sprocket holes 16. The solenoids receive their actuating signals from the computer 40 as discussed above. The pin 49 is guided to punch through the strip material 10, by the sprocket punch bar 54. The latter also admits guide rails 52 whereby the punch frame 44 is located accurately with respect to the platen 50 on which the strip material 10 is transported.

Figure 4:
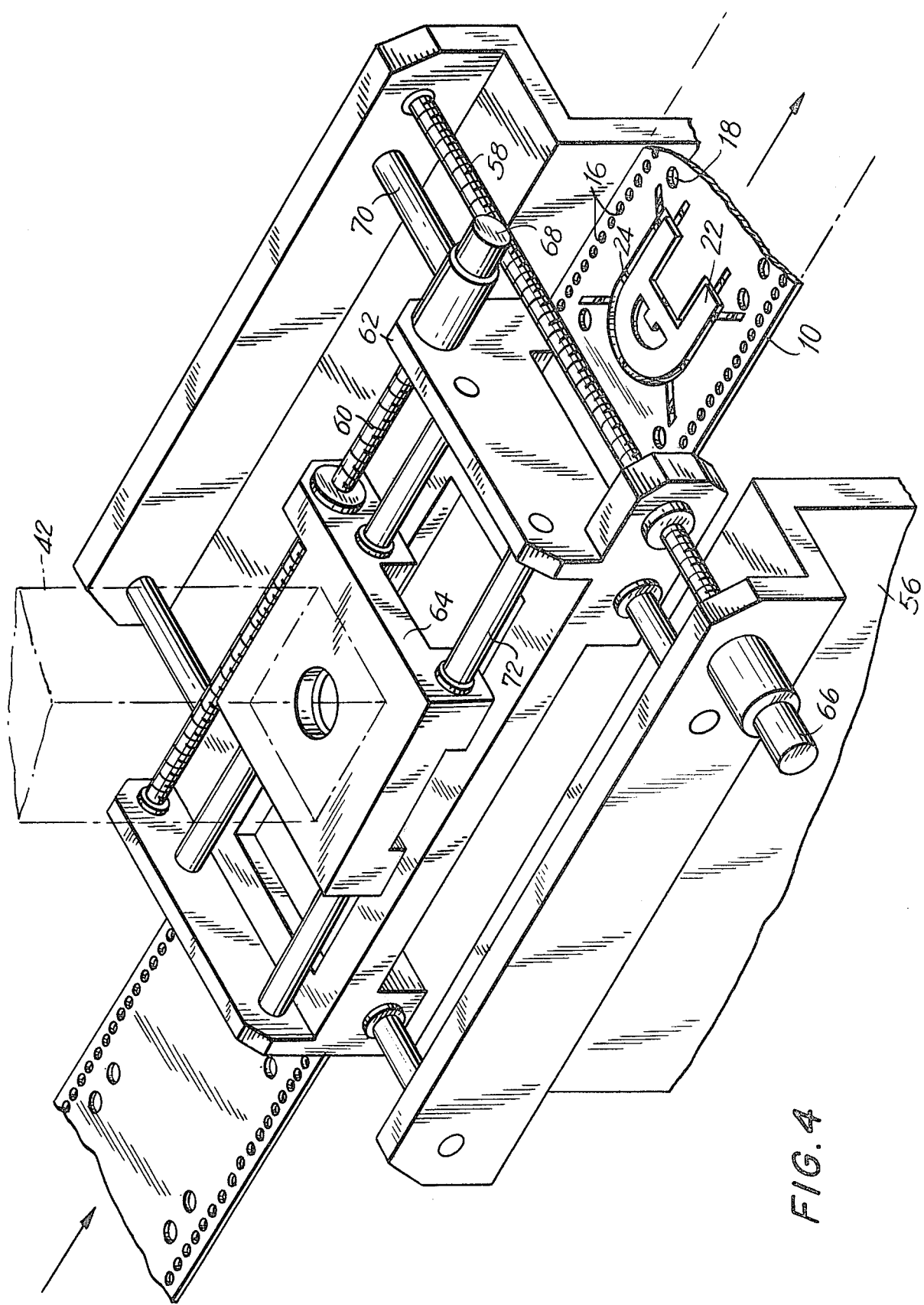
FIG. 4 is a perspective view and shows the processing station for cutting the sheet material to form the planar elements.

The mechanism for displacing the laser cutting head 42 in X-Y directions for forming the planar element 22 with the required outline, is shown in FIG. 4. A supporting frame 56 supports a carriage 62 on guide rails 70. The carriage 62 may be displaced in the X-direction by rotation of lead screw 58 which is driven by a motor 66. The latter receives its actuating signals from the computer 40. On the carriage 62, a mounting member 64 supporting the laser head 42, may be displaced in the Y-direction along guide rails 72. The displacement of the mounting member 64 is achieved by rotation of lead screw 60 which is driven by a motor 68 that also receives its actuating signals from the computer 40. By rotating lead screw 58 in relation to lead screw 60, the laser head 42 may be displaced so that it will follow a predetermined contour for purposes of cutting out the planar element 22. The computer 40 stores the coordinates of the path to be traced by the cutting laser head 42, and provides actuating signals to drive motors 66 and 68 whereby the desired displacement of the laser head 42 is achieved.

Figure 5:
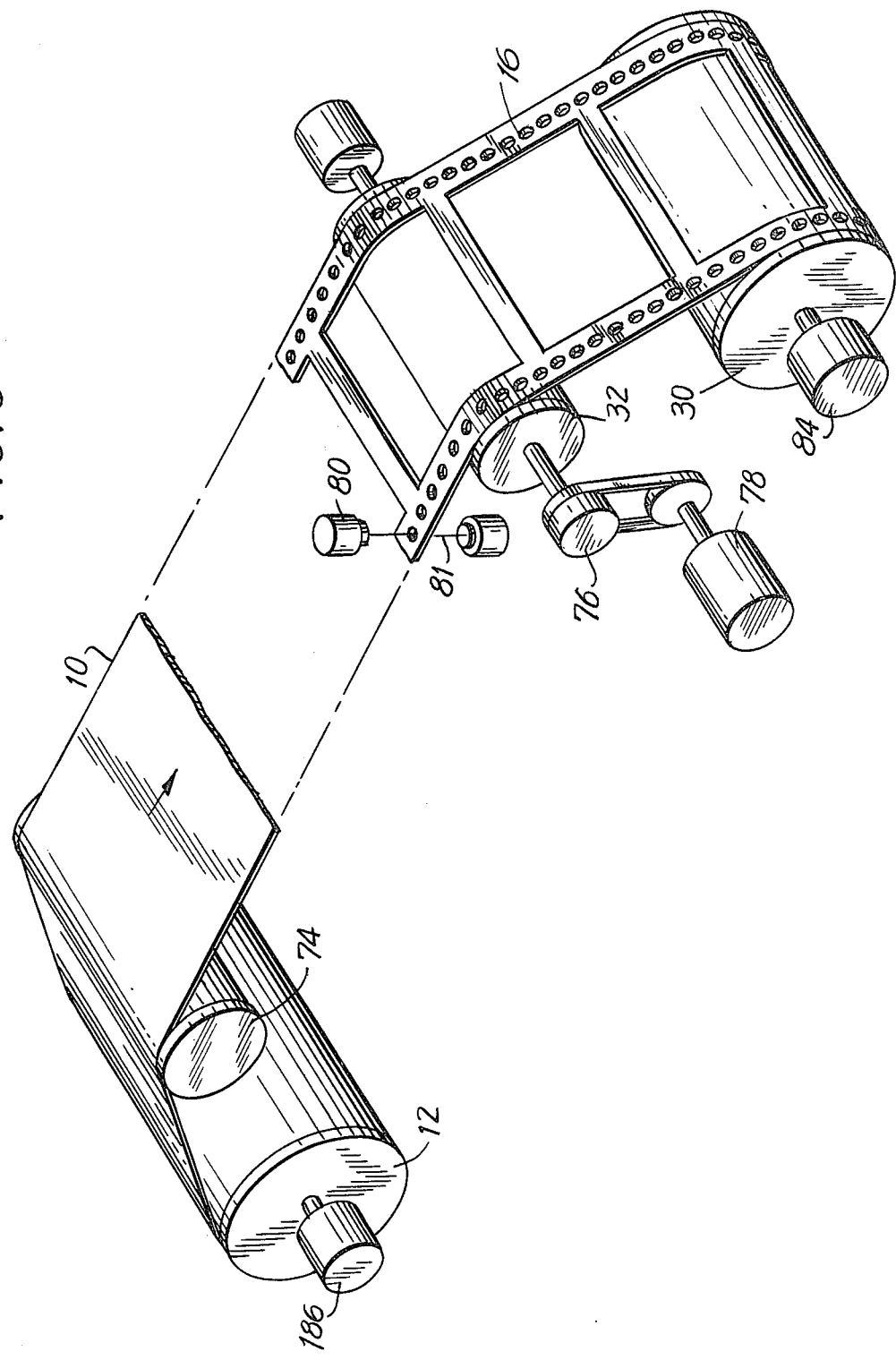
FIG. 5 is a perspective view and shows the transport mechanism for advancing the sheet strip of FIG. 1 along the production line to and from processing stations located therealong.

FIG. 5 shows the essential elements for transporting the sheet strip material 10 along the production line. In addition to the storage reel 12 and take-up reel 30, already discussed, an idler roller 74 may be provided for purposes of deflecting the strip in the required direction. A torque limit clutch 76 may also be interposed between the drive motor 78 and the drive sprocket 32. For purposes of further assuring that the strip material is advanced in precise increments, a sensor 70 may be provided. This sensor may be a photoelectric device, for example, which directs a beam of light through the sprocket holes 16. As the strip 10 travels, the beam 81 becomes interrupted, and these interruptions may be counted to obtain the actual distance traveled by the sheet strip 10. To leave the strip 10 taut while passing through the production line, tension torque motors 186 and 84 may be connected to the reels 12 and 30. The motors 186, 84, clutch 76, and optical device 80 are all well known in the art and are not discussed in further detail here for that reason.

To align the blanks 28 in proper registration and relationship to each other, aligning rods 86 are provided, as shown at station 26 in FIG. 2. These rods 86 pass through the registration holes 18 and assure that the blanks, and thereby the planar elements 22, are properly stacked relative to each other. The rods 18 are also useful in applying the necessary forces to remove the unwanted blank material surrounding the planar elements 22, so as to result in the stack 88 shown in FIG. 6. In this stack 88, the planar elements are all attached to neighboring elements by adhesive, so that a solid rigid structure may be obtained.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for producing planar elements for construction of a surface, comprising the steps of: feeding material with substantially parallel surfaces into a processing path; applying at least one reference location hole through said material within a predetermined area of said material for registering positions of planar elements relative to each other when stacked; cutting a predetermined contour through said material for subsequent removal of a predetermined planar element from said material; applying a cut through said material and spaced from said planar element for producing a blank carrying said planar element, said cut enclosing said planar element and having a closed cutting line; removing said blank from said material; collecting the material remaining after said blank has been removed, said contour being cut along a cut path in which tabs are left for supporting said planar elements, said tabs connecting said planar element to said blank; stacking blanks in predetermined relationship to each other through registration of said reference location hole; and severing said tabs after stacking said blanks for separating the planar elements from the blanks to form said surface of stacked elements, said reference location hole being applied before said planar element and blank are detached from said material, said planar elements being stacked to a depth dependent on the characteristics of said surface.

2. A method as defined in claim 1 including the step of punching sprocket holes to be engaged by a driving sprocket through said material, said driving sprocket engaging said sprocket holes for transporting said material along said processing path.

3. A method as defined in claim 1 including the step of applying adhesive to preselected areas of said planar elements by controlling a plurality of adhesive applicators distributed over the area of the planar elements; and passing a rod through said hole for registering positions of planar elements relative to each other when stacked.

4. A method as defined in claim 1, wherein said material comprises a sheet metal strip.

5. A method as defined in claim 1 including the step of passing a rod through said hole for registering positions of planar elements relative to each other when stacked.

6. A method as defined in claim 1 including the step of applying adhesive to selected areas of at least said planar elements prior to stacking the blanks.

7. Apparatus for carrying out the method of claim 1 for producing planar elements for construction of a surface, comprising: means for feeding material with substantially parallel surfaces into a processing path; means for applying at least one reference location hole through said material within a predetermined area of said material for registering positions of planar elements relative to each other when stacked; means for cutting a predetermined contour through said material for subsequent removal of a predetermined planar element from said material; means for applying a cut through said material and spaced from said planar element for producing a blank carrying said planar element, said cut enclosing said planar element and having a closed cutting line; means for removing said blank from said material; and means for collecting the material remaining after said blank has been removed, said contour being cut along a cut path in which tabs are left for supporting said planar elements, said tabs connecting said planar element to said blank; said blanks being stacked in a predetermined relationship to each other through registration of said reference location hole; said tabs being severed after stacking said blanks for separating the planar elements from the blanks to form said surface of stacked elements, said reference location hole being applied before said planar element and blank are detached from said material, said planar elements being stacked to a depth dependent on the characteristics of said surface.

8. Apparatus as defined in claim 7 including a plurality of adhesive applicators distributed about the area of said planar elements; means for controlling individual ones of said adhesive applicators for applying adhesive to preselected areas of said planar elements; and rod means passing through said hole for registering positions of planar elements relative to each other when stacked.

9. Apparatus as defined in claim 7 including means for applying sprocket holes to said material, and means engaging said sprocket holes for transporting said material along processing path.

10. Apparatus as defined in claim 7 including means for applying adhesive to selected areas of at least said planar elements prior to stacking blanks supporting said planar elements.

11. Apparatus as defined in claim 10 including means for stacking blanks holding said planar elements.

12. Apparatus as defined in claim 11 including rod means passing through said hole for registering positions of planar elements relative to each other when stacked.

* * * * *